United States Patent [19]

Bonvini

[11] Patent Number: 4,989,153

[45] Date of Patent: Jan. 29, 1991

[54] PERFECTED SINTERING MACHINE AND METHOD OF OPERATION

[75] Inventor: Giuseppe Bonvini, Piacenza, Italy

[73] Assignee: Sintris S.r.L., Piacenza, Italy

[21] Appl. No.: 233,728

[22] Filed: Aug. 19, 1988

[30] Foreign Application Priority Data

Sep. 11, 1987 [IT] Italy .............................. 44810 A/87

[51] Int. Cl.[5] .......................... G06F 15/46; B21J 1/06; B22F 33/02

[52] U.S. Cl. .................................... 364/477; 219/149; 419/48; 419/52; 419/54

[58] Field of Search .......................... 75/5, 8, 257, 228; 419/48, 52, 54; 432/13; 364/477, 476; 219/10.41, 10.75, 243, 78, 149; 100/38

[56] References Cited

U.S. PATENT DOCUMENTS

| | | | |
|---|---|---|---|
| 3,241,956 | 3/1966 | Inoue | 419/52 |
| 3,331,686 | 7/1967 | Bonis et al. | 419/52 |
| 3,508,029 | 4/1970 | Inouse | 219/149 |
| 3,567,903 | 3/1971 | Parker | 219/149 |
| 3,670,137 | 6/1972 | Inouse | 219/149 |
| 3,873,805 | 3/1975 | Inouse | 219/149 |
| 4,414,028 | 11/1983 | Inoue | 419/31 |
| 4,456,578 | 6/1989 | Ward | 419/52 |
| 4,720,256 | 1/1988 | Asari et al. | 419/49 |

*Primary Examiner*—Jerry Smith
*Assistant Examiner*—Jim Trammell
*Attorney, Agent, or Firm*—Notaro & Michalos

[57] ABSTRACT

A sintering machine for applying heat and pressure to a die retained between two plate sets, includes a temperature sensor, a position sensor and a pressure sensor which are all connected to a computer for sensing the temperature of and pressure applied to the die, as well as the position of a movable one of the plate sets. This information is used to control a power supply unit which supplies current through the die to heat the die, and a hydraulic press for moving the movable one of the plate sets. Pressure and temperature are controlled in a discontinuous fashion during discrete intervals until a selected final temperature and pressure are reached. This more closely controls the sintering process over earlier systems which applied continously increasing temperature and pressure to the die.

11 Claims, 4 Drawing Sheets

PERFECTED SINTERING MACHINE AND METHOD OF OPERATION

FIELD AND BACKGROUND OF THE INVENTION

This invention relates to a perfected sintering machine specifically designed for the manufacture of components for tools and the like.

The invention also relates to a method of operation. Unlike known systems, the invention provides for pressure and heat to be applied to the material not at continually increasing values, but at intervals in accordance with a preset curve.

The various functions of the apparatus are electronically controlled by computer on the basis of data supplied by the control instruments which constantly monitor the plate movements and die temperature.

In the manufacture of sintering tools the powder used to make the part in question is introduced into a die and subjected to high temperature and pressure for a period of time which depends on the size of the object, the material used, etc.

This melts the surface of the granules to form a solid, compact whole.

Known types of sintering apparatus basically comprise a hydraulic press, electrical systems designed to heat the plates which compress the material in the die, and systems which eliminate heat in order to cool the die partially before removal.

The plates generally consist of several parts. One part, generally made of copper, is fixed to a mobile support or a machine structure, and the other, made of graphite or steel, comes into contact with the die.

This system is necessary because the part in contact with the die reaches extremely high temperatures which it must resist without buckling, while the outer part, in contact with the machine casing or the mobile support, must have high electrical conductivity and be cooled so that the heat developed at the die does not reach and damage the other parts of the machine.

This system, though necessary, also presents considerable drawbacks because the contact surface between the outer and inner plates rapidly oxidizes, preventing the passage of current and requiring frequent stoppages of the operating cycle during the day so that the plate can be cleaned.

This oxidation also causes wear on the contact surfaces between the two plates, which therefore require fairly frequent replacement.

A further drawback of known types of apparatus is that cooling of the various parts of the machine is not always efficient, as the coolant is used to eliminate heat from parts (such as the plates and the transformer) which operate at very different temperatures and therefore require different coolant flows.

Finally, in known machines the pressure and temperature are gradually, continuously increased until the maximum value is reached, after which the die cooling stage beings, and this also often leads to imperfect results.

The sintering machines in current use are basically rather imprecise and present a series of defects which produce results that are not always accurate and increase production time, thereby affecting the cost of the end product.

SUMMARY OF THE INVENTION

To eliminate the difficulties described above, this invention offers a perfected sintering machine in which the operation of the various parts is automatically regulated by electronic control devices.

The machine of the invention includes a variety of innovations which are described in detail below, by way of example but not of limitation, by reference to the annexed figures.

DESCRIPTION OF THE PREFERRED EMBODIMENT

The apparatus making up the sintering machine in accordance with the invention can basically be divided up as follows:

a press into which the die is inserted, the press having a high-pressure hydraulic drive circuit press heating systems and systems designed to supply the necessary current a cooling circuit to keep the temperature of the various components within required limits and electronic control and drive systems for the various parts.

Figure 1:
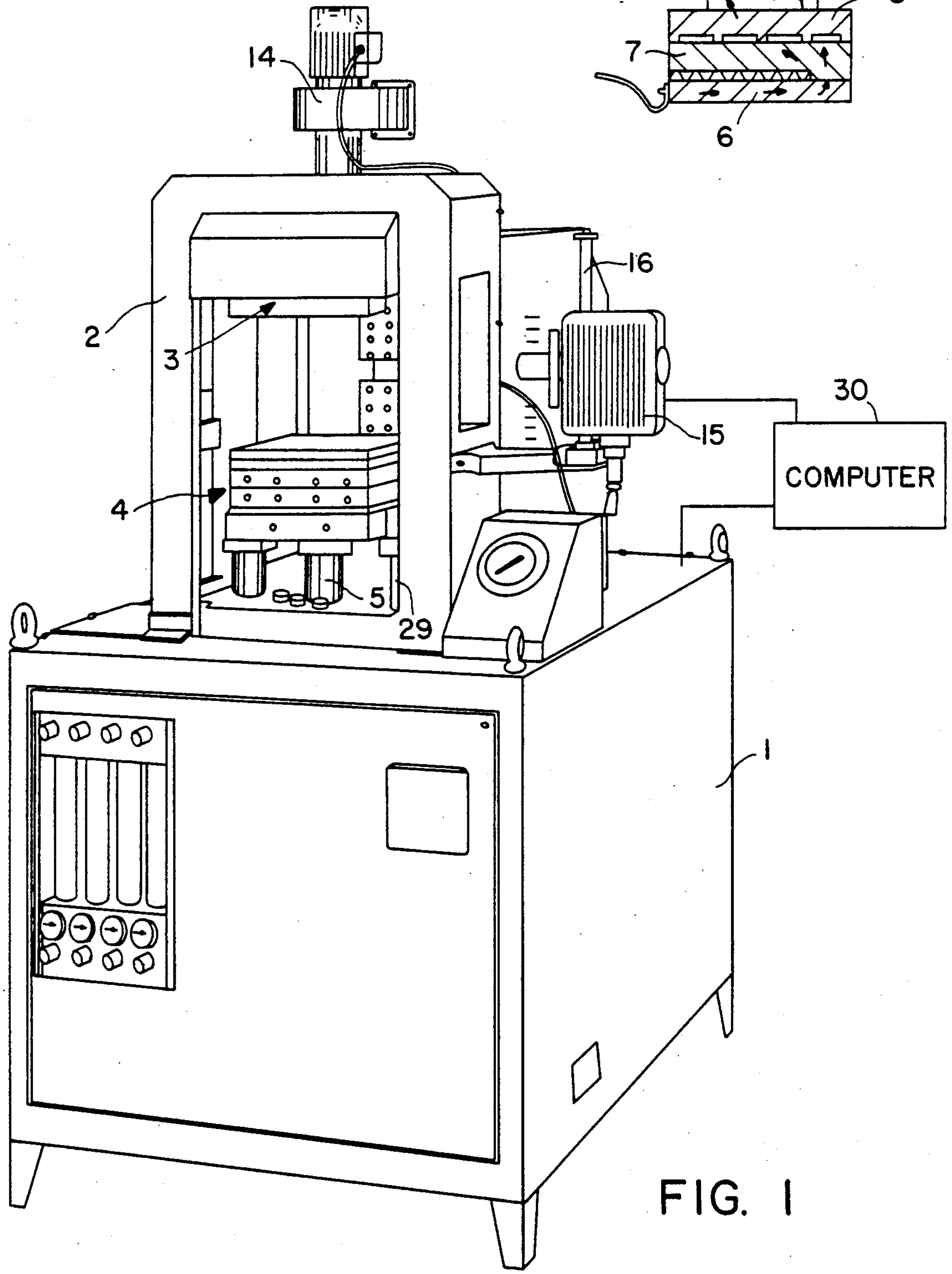
FIG. 1 is a perspective view of a machine in accordance with the invention
Figure 2:
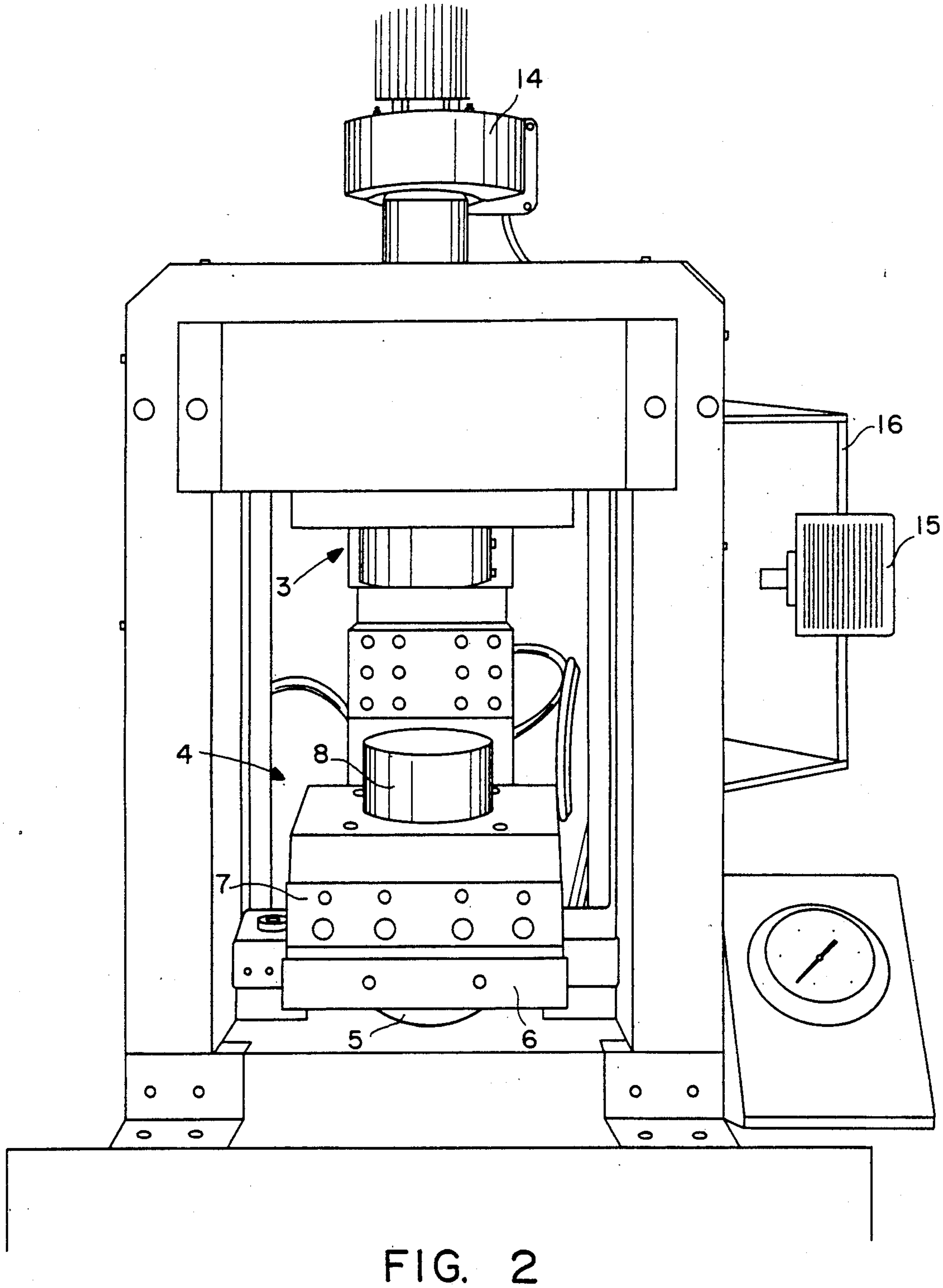
FIG. 2 is a front view of retainer plates and a relative support structure of the machine

As shown in FIG. 1, the sintering machine in accordance with the invention comprises a base 1, to which is fitted a casing 2 of a press which comprises two sets of plates 3 and 4. The first set is fixed to an upper cross-piece of the casing, and the second is fitted to rod 5 of a hydraulic piston which acts as drive means to move plate set 4.

The motor, pump, and relative hydraulic circuits are located inside base 1.

Figure 6:
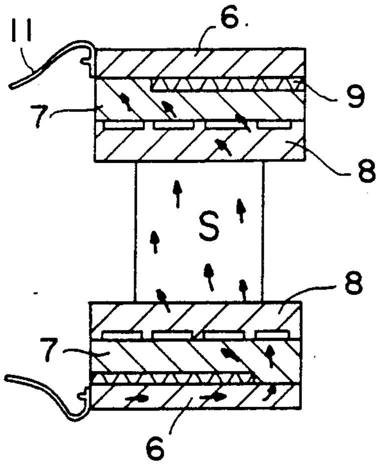
FIG. 5 is a wiring diagram of power supply units in a sintering machine in accordance with the invention and FIG. 6 is a sectional view of plates and a die of the present invention.
Figure 3:
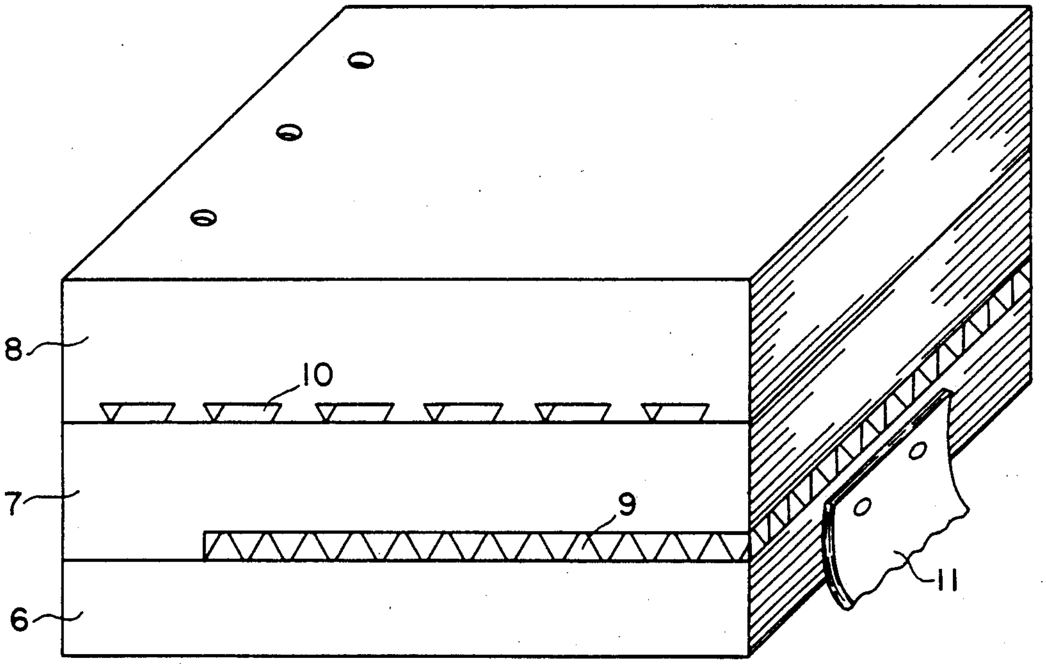
FIG. 3 is a perspective view of a plate used in the machine in accordance with the invention

Each set of plates 3 and 4 (see FIGS. 3 and 6) consists of a silver-plated copper support plate 6, an L-sectioned graphite plate 7 which has a leg contacting the plate 6, and a second graphite plate 8 which rests on plate 7.

Hereafter the term "support plate" will be used to indicate the silver-plated copper plate 6, "intermediate plate" to indicate the graphite plate 7 in contact with it, and "electrode" to indicate the plate 8 which comes into contact with the dies containing the material to be sintered.

Intermediate plate 7 is fitted in such a way that it only comes into contact with support plate 6 where the surface projects, while a sheet 9 of insulating material such as asbestos or similar material is fitted in the cavity formed between plates 6 and 7.

Electrode 8 has a series of milled grooves 10 in the wall resting on plate 7, which are designed to reduce the contact surface between the electrode and the intermediate plate.

Fixed upper plate set 3 presents a symmetrical arrangement (see FIG. 6), the only difference being that insulating layer 9 is fitted on the opposite side to that on which it is fitted in the lower plate set.

During use, die S is positioned and pressed between the two sets of plates, which are connected to the secondary of a transformer, acting as heating means, so that when the presence of the die closes the circuit they are heated by induction.

The current reaches the sets of plates via a series of leads 11 connected to the support plates, one on the side where the insulating layer is fitted and the other on the opposite side.

This special arrangement is designed to produce even heating of the die. If no insulating layer were fitted or if they were fitted to both plates on the same side, the current, which seeks the shortest route, would tend to heat the part of the die closest to leads 11 most strongly, producing uneven heating. This is prevented by the system described, in which the current follows the path indicated by the arrows in the FIG. 6.

Grooves 10 in the electrode are designed to reduce the contact surface between the electrode and the intermediate plate in order to minimize heat loss.

As lower plate 6 comes into contact with the remaining parts of the machine it must be cooled; a cooling circuit filled with coolant is used for this purpose which will be described below.

Electrode 8 must be kept at a high temperature, on the other hand, which means that in order to reduce heat loss it is advisable to minimize the contact surface between the electrode and the lower plates.

As a result, grooves 10 have been dimensioned so as to leave a contact surface between the electrode and plate 7 which is sufficient to allow the passage of the current required for heating, while limiting the passage of heat.

Figure 5:
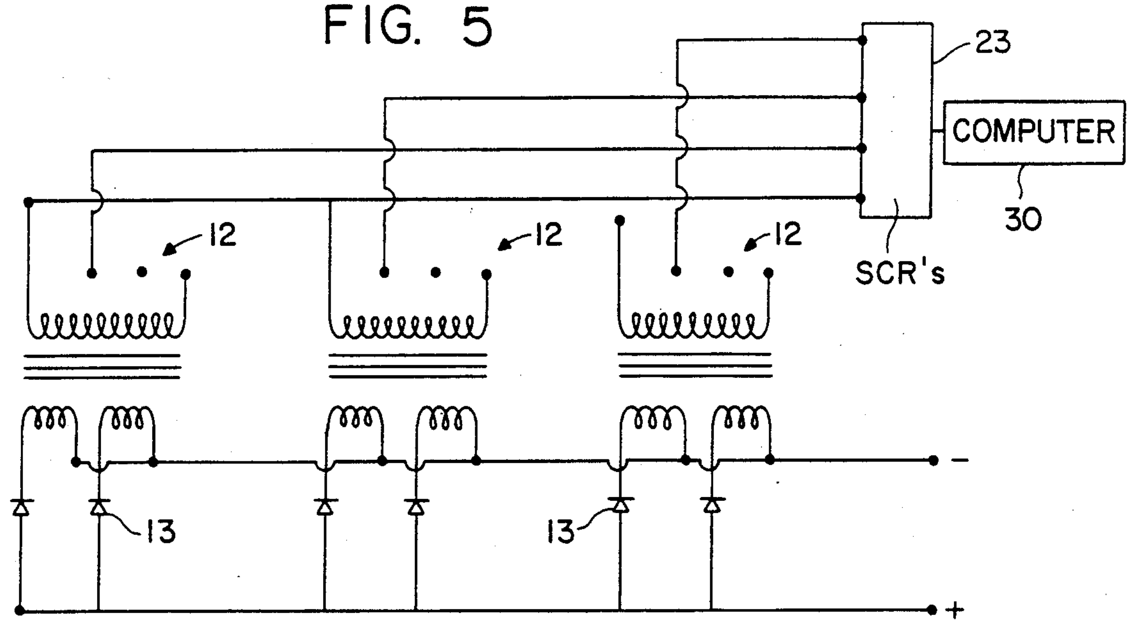

FIG. 5 is a wiring diagram of the plate power transformer.

Unlike known sintering machines which use a single-phase transformer, the machine in accordance with the invention uses a three-phase transformer, which prevents excessive imbalance in the mains when the machine comes into operation.

To obtain various output voltage values, the primary has a number of inputs, indicated as number 12, while the secondary is conveniently split with the circuits connected in parallel. SCR's 23 are connected to the primaries.

This reduces air gap losses and makes it easier to construct the cooling circuit.

A number of SCR diodes 13 designed to supply a direct current output are fitted at the secondary output.

An extractor 14 shown in FIG. 1 is fitted at the top of machine casing 2, and an optical pyrometer 15 designed to detect the die temperature during sintering is fitted on one side, connected to a schematically shown computer 13 which controls the various machine functions.

Pyrometer 15 is fitted to support 16, and can be positioned at various heights.

To ensure proper operation of the machine the temperature in each part o the die must be kept as even as possible, which means that the temperature of both the electrodes and the relative sets of plates must be equal.

As the electrodes reach very high temperatures (800°-1000° C.), the heat lost must be prevented from overheating the other parts of the machine. To prevent this, a cooling device is used which comprises various independently regulated circuits designed to cool the plates, the transformer, and the structure.

Figure 4:
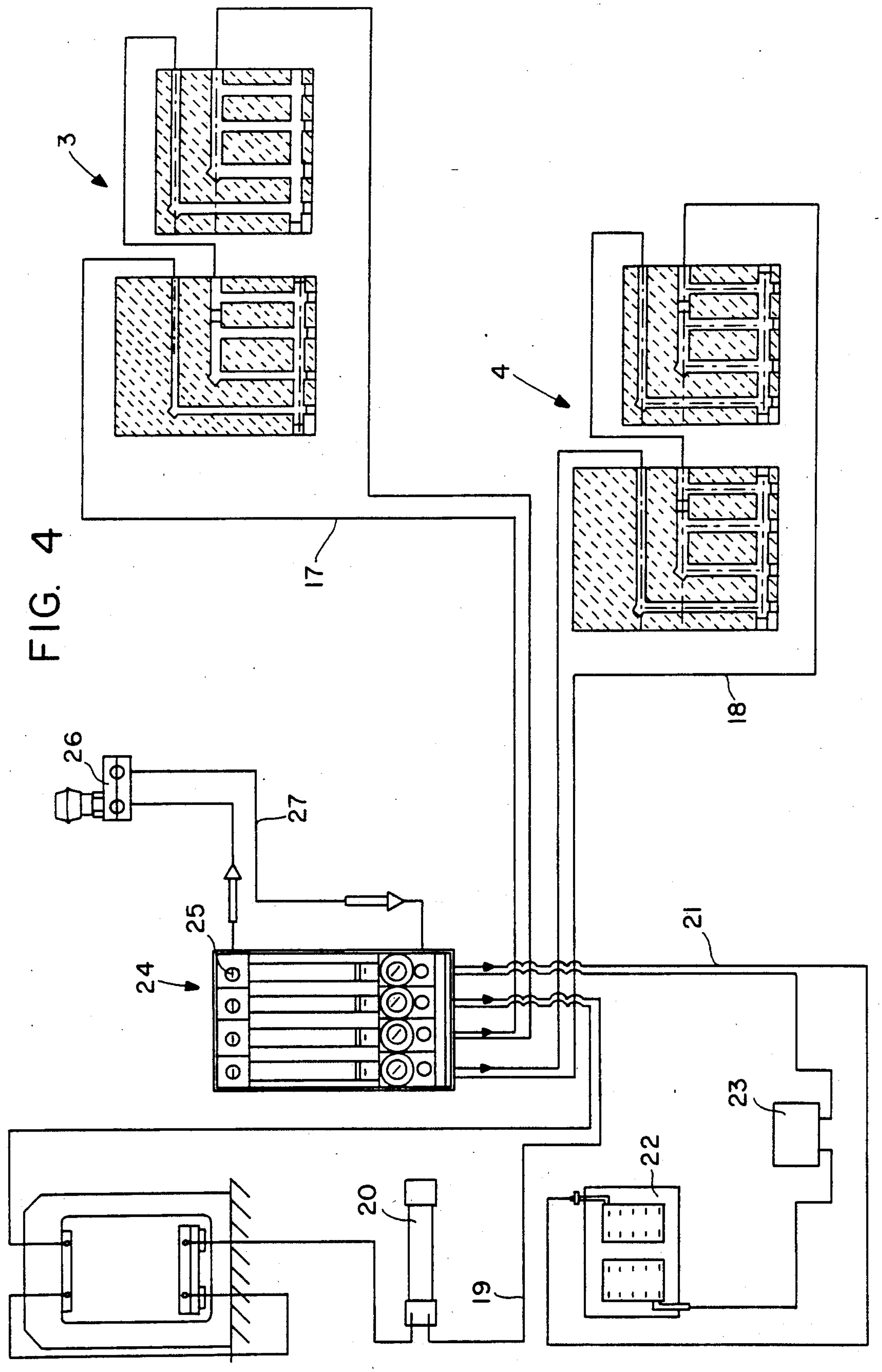
FIG. 4 is a cooling circuit diagram of the invention

The cooling circuit is illustrated in diagram form in FIG. 4 and comprises four sections.

The first two, indicated as nos. 17 and 18, carry the coolant to plate sets 3 and 4 respectively.

A third circuit (19) carries water first to radiator 20 and then to cool the machine casing.

The fourth circuit (21) cools the transformer (indicated in FIG. 4 as no. 22) and a set of SCR diodes (indicated as 23) connected to the primary, whose function will be described below.

All circuits are connected to a control and regulation device 24 containing a flow regulator of known type for each circuit which is operated by a dial 25 or the like to constrict the outlet and thus regulate the passage of coolant and the amount of heat eliminated.

The flow switch fitted to water supply and drainage circuit 27 is indicated as no. 26.

During its movements, movable plate set 4 activates an encoder 29, acting as a position sensor and connected in turn to the computer which controls the machine.

The computer is also connected via suitable interfaces to pyrometer 15 and SCR diodes 23, fitted to the plate power transformer primary.

The computer operates the SCR diodes on the basis of the pulses generated by the encoder, which constantly inform it of the position reached by the mobile plate, and on the basis of the die temperature detected by pyrometer 15, in order to regulate the amount of current sent to the plates and thus the die temperature.

The maximum temperature must be reached in a given time span, depending on the material to be sintered, to prevent deterioration of the product.

An over-rapid temperature increase can burn the powder due to the passage of excessively high current, while an excessively long heating time can cause oxidation.

The maximum temperature must therefore be reached within a fairly narrow time interval.

As already mentioned, in known apparatus the temperature and pressure are increased gradually but continuously.

The method in accordance with the invention, on the other hand, increases the temperature and pressure at intervals of a range and duration which depend on the material used, and can readily be determined by an expert in the field, on the basis of the desired result in each case.

During these operations the computer, which is constantly informed of the temperature reached by the die and the pressure inside it, compares these values with a reference curve and operates SCR diodes 23 accordingly to regulate the passage of current. Pressure sensing means may be part of the drive means for moving plate set 4.

In the interval between two successive plate movements the material particles are able to settle, while extractor 14 exhausts the fumes produced during sintering.

The machine operates as follows: The material to be sintered is introduced into the die, the die is placed on the lower plate set, the computer is programmed in accordance with the type of material introduced and the required result, and the machine is started up.

The hydraulic units push the movable plates upwards, bringing the die into contact with the upper electrode; at this point current begins to flow through the plates, which are heated by induction and transmit heat to the die.

The voltage is determined in advance by selecting the appropriate input on the power transformer primary, while the computer, via the SCR diodes, regulates the amount of current which can circulate in the primary and consequently the die heating time.

As the temperature increases, the pyrometer sends a series of signals to the computer, which also receives pulses from a transducer which detects the pressure exerted on the die.

These values are constantly compared with the reference curve, and if any differences are found the computer operates the SCR diodes to adjust the temperature, or the other controls to interrupt or resume the advance of the movable plates.

These movements are detected by the encoder and transmitted to the computer which, at the end of the treatment stage, instructs the apparatus to begin a new cycle.

An expert in the field could devise numerous modifications and variations, all of which should be deemed to be included in the ambit of this invention.

What is claimed:

1. A sintering machine for heating a die to a selected temperature and for subjecting the die to a selected pressure for sintering material in the die, comprising:
- a pair of plate sets for retaining a die therebetween;
- drive means connected to at least one of the plate sets for moving the plate sets together along a single axis to apply pressure to a die retained between the plate sets along the single axis only;
- heating means connected to the plate sets for heating a die retained between the plate sets;
- temperature detecting means for sensing the temperature of a die retained between the plate sets;
- position sensing means operatively connected to the at least one plate set for sensing the position of the at least one plate set;
- pressure sensing means for sensing the pressure being exerted by the plate sets on a die retained between the plate sets and along the single axis; and
- electronic system means connected to said drive means, heating means, temperature detecting means, position sensing means and pressure sensing means for controlling the operation of said drive means and said heating means on the basis of temperature, position and pressure values supplied to said electronic system means by said temperature detecting means, position sensing means and pressure sensing means respectively, for discontinuously increasing the temperature and pressure in steps at selected intervals until the selected temperature and selected pressure are reached.

2. A machine according to claim 1, wherein each of said plate sets comprises a silver-plated copper support plate connected to said heating means, an electrode plate for engagement with a die to be held between said plate sets, and an intermediate plate connected between said support plate and said electrode plate for mechanically connecting said support plate to said electrode plate and for passing current between said support plate and said electrode plate.

3. A machine according to claim 1, including cooling means containing a plurality of cooling circuits, one of said cooling circuits extending to said pair of plate sets and another one of said cooling circuits extending to said heating means, said cooling means including separate regulators for each of said cooling circuits for separately regulating an amount of cooling for said pair of plate sets and said heating means.

4. A sintering machine for heating a die to a selected temperature and for subjecting the die to a selected pressure for sintering material in the die, comprising:
- a pair of plate sets for retaining a die there between;
- drive means connected to at least one of the plate sets for moving the plate sets together to apply pressure to a die retained between the plate sets;
- heating means connected to the plate sets for heating a die retained between the plate sets;
- temperature detecting means for sensing the temperature of a die retained between the plate sets;
- position sensing means operatively connected to the at least one plate set for sensing the position of the at least one plate set;
- pressure sensing means for sensing the pressure being exerted by the plate sets on a die retained between the plate sets;
- electronic system means connected to said drive means, heating means, temperature detecting means, position sensing means and pressure sensing means for controlling the operation of said drive means and said heating means on the basis of temperature, position and pressure values supplied to said electronic system means by said temperature detecting means, position sensing means and pressure sensing means respectively, for discontinuously increasing the temperature and pressure at selected intervals until the selected temperature and selected pressure are reached;
- each of said plate sets comprising a silver-plated copper support plate connected to said heating means, an electrode plate for engagement with a die to be held between said plate sets, and an intermediate plate connected between said support plate and said electrode plate for mechanically connecting said support plate to said electrode plate and for passing current between said support plate and said electrode plate.

5. A machine according to claim 4, wherein said electrode plate has a surface engaging a surface of said intermediate plate, a plurality of grooves defined in at least one of said surfaces for reducing a compact area between said surfaces to limit heat losses during a transmission of current between said surfaces.

6. A machine according to claim 5, wherein the intermediate plate of each of said plate sets has an L-sectioned surface having a leg contacting said support plate, said leg being on one edge of said intermediate plate, and an insulation layer engaged between said support plate and said intermediate plate adjacent said leg, the leg of said intermediate plates of one of said plate sets being positioned on an opposite edge from the leg of the intermediate plate of the other one of the plate sets so that current supplied to one plate set passes through each leg and across a die retained between said plate sets.

7. A machine according to claim 6, wherein said intermediate plates and said electrode plates of said pair of plate sets are made of graphite.

8. A machine according to claim 7, including cooling means containing a plurality of cooling circuits, one of said cooling circuits extending to said pair of plate sets and another one of said cooling circuits extending to said heating means, said cooing means including separate regulators for each of said cooling circuits for separately regulating an amount of cooling for said pair of plate sets and said heating means.

9. A machine according to claim 8, wherein said heating means comprises an electrical power supply unit connected to said pair of plate sets for passing a current through said pair of plate sets, said power supply unit containing a three-phase transformer having a plurality of inputs, and separate input control diodes connected respectedly to said inputs for controlling current supplied to said inputs to regulate an amount of current supplied by said power supply unit to said pair of plate sets.

10. A sintering machine for heating a die to a selected temperature and for subjecting the die to a selected pressure for sintering material in the die, comprising:

a pair of plate sets for retaining a die there between;

drive means connected to at least one of the plate sets for moving the plate sets together to apply pressure to a die retained between the plate sets;

heating means connected to the plate sets for heating a die retained between the plate sets;

temperature detecting means for sensing the temperature of a die retained between the plate sets;

position sensing means operatively connected to the at least one plate set for sensing the position of the at least one plate set;

pressure sensing means for sensing the pressure being exerted by the plate sets on a die retained between the plate sets;

electronic system means connected to said drive means, heating means, temperature detecting means, position sensing means and pressure sensing means for controlling the operation of said drive means and said heating means on the basis of temperature, position and pressure values supplied to said electronic system means by said temperature detecting means, position sensing means and pressure sensing means respectively, for discontinuously increasing the temperature and pressure at selected intervals until the selected temperature and selected pressure are reached; and cooling means containing a plurality of cooling circuits, one of said cooling circuits extending to said pair of plate sets and another one of said cooling circuits extending to said heating means, said cooling means including separate regulators for each of said cooling circuits for separately regulating an amount of cooling for said pair of plate sets and said heating means.

11. A machine according to claim 10, wherein said heating means comprises an electrical power supply unit connected to said pair of plate sets for passing a current through said pair of plate sets, said power supply unit containing a three-phase transformer having a plurality of inputs, and separate input control diodes connected respectedly to said inputs for controlling current supplied to said inputs to regulate an amount of current supplied by said power supply unit to said pair of plate sets.

* * * * *